(12) United States Patent
Hortner

(10) Patent No.: US 11,340,608 B2
(45) Date of Patent: May 24, 2022

(54) UNMANNED AIRCRAFT WITH A MODULAR SWARM CONTROL UNIT

(71) Applicant: ARS ELECTRONICA LINZ GMBH & CO KG, Linz (AT)

(72) Inventor: Horst Hortner, Kleinzell (AT)

(73) Assignee: ARS ELECTRONICA LINZ GMBH & CO KG, Linz (AT)

( * ) Notice: Subject to any disclaimer, the term of this patent is extended or adjusted under 35 U.S.C. 154(b) by 286 days.

(21) Appl. No.: 16/480,941

(22) PCT Filed: Apr. 26, 2018

(86) PCT No.: PCT/AT2018/060082
§ 371 (c)(1),
(2) Date: Jul. 25, 2019

(87) PCT Pub. No.: WO2018/195573
PCT Pub. Date: Nov. 1, 2018

(65) Prior Publication Data
US 2019/0391575 A1    Dec. 26, 2019

(30) Foreign Application Priority Data
Apr. 28, 2017    (AT) .................................. 50076/2017

(51) Int. Cl.
*B64C 39/02*    (2006.01)
*G05D 1/00*    (2006.01)
*G08G 5/00*    (2006.01)

(52) U.S. Cl.
CPC ......... *G05D 1/0027* (2013.01); *B64C 39/024* (2013.01); *G08G 5/006* (2013.01);
(Continued)

(58) Field of Classification Search
CPC ........ G05D 1/0027; G05D 1/104; G05D 1/00; B64C 39/024; B64C 2201/12;
(Continued)

(56) References Cited

U.S. PATENT DOCUMENTS

| 5,521,817 A | * | 5/1996 | Burdoin | ............... G05D 1/0027 |
| | | | | 244/190 |
| 10,665,110 B2 | * | 5/2020 | Collins | ............... G08G 5/0069 |

(Continued)

FOREIGN PATENT DOCUMENTS

WO    2013/002778 A1    1/2013

OTHER PUBLICATIONS

International Preliminary Report on Patentability for PCT/AT2018/060082 dated Apr. 25, 2019.
(Continued)

*Primary Examiner* — Yonel Beaulieu
(74) *Attorney, Agent, or Firm* — Workman Nydegger

(57) ABSTRACT

An unmanned aerial vehicle having a drive unit for enabling the flight of the aerial vehicle in air space and having a flight control unit, which is configured to receive control information from a radio remote control or to control positions of the aerial vehicle in air space that employ stored position information in order to control the flight course of the aerial vehicle. A modular flight formation control unit has a first interface with the flight control unit and a second radio interface to a flight formation ground control unit or with flight formation control units of other aerial vehicles, and the flight formation control unit configured to generate or send control information corresponding to the radio remote control and is configured to output, via the first interface, flight formation control information relevant for the formation flight of at least two aerial vehicles to the flight control unit.

13 Claims, 2 Drawing Sheets

(52) U.S. Cl.
CPC ........ G08G 5/0039 (2013.01); *B64C 2201/12* (2013.01); *B64C 2201/143* (2013.01); *B64C 2201/145* (2013.01)

(58) Field of Classification Search
CPC ........ B64C 2201/143; B64C 2201/145; B64C 27/08; G08G 5/0039; G08G 5/006; G08G 5/0013; G08G 5/0043; G08G 5/0052; G08G 5/0069; G08G 5/00
See application file for complete search history.

(56) References Cited

U.S. PATENT DOCUMENTS

| | | | | |
|---|---|---|---|---|
| 10,674,062 | B2* | 6/2020 | Li | G05D 1/0038 |
| 10,725,482 | B2* | 7/2020 | Zhu | B64C 39/024 |
| 10,762,795 | B2* | 9/2020 | Contreras | G06T 5/002 |
| 10,789,853 | B2* | 9/2020 | Priest | G08G 5/0034 |
| 10,825,345 | B2* | 11/2020 | Sugahara | H04W 4/40 |
| 10,909,861 | B2* | 2/2021 | Selander | G08G 5/0013 |
| 11,032,148 | B2* | 6/2021 | Sweet, III | H04L 1/0009 |
| 11,064,363 | B2* | 7/2021 | Fox | H04L 63/0876 |
| 11,068,837 | B2* | 7/2021 | Murray | G06Q 10/08355 |
| 2006/0071929 | A1* | 4/2006 | Stinis | G09F 21/16 345/213 |
| 2009/0212157 | A1 | 8/2009 | Arlton et al. | |
| 2015/0346722 | A1 | 12/2015 | Herz et al. | |
| 2017/0268896 | A1* | 9/2017 | Bai | G08G 1/0141 |
| 2018/0039287 | A1* | 2/2018 | Shattil | H04B 7/024 |
| 2018/0253092 | A1* | 9/2018 | Trapero Esteban | H04W 12/06 |
| 2019/0047698 | A1* | 2/2019 | Jassowski | G05D 1/104 |

OTHER PUBLICATIONS

Burkle, et al: "Towards Autonomous Micro UAB Swarms", Journal of Intelligent and Robotic Systems, Theory and Applications—(Incorporating Mechatronic Systems Engineering), Kluwer Academic Publishers, DO, Bd. 61, Nr. 1-4, Oct. 27, 2010, Seiten 339-353, XP019855703, ISSN: 1573-0409, DOI: 10.1007/S10846-010-9492-X.

International Search Report dated Aug. 13, 2018 from International Patent Application No. PCT/AT2018/060082 filed Apr. 26, 2018.

* cited by examiner

UNMANNED AIRCRAFT WITH A MODULAR SWARM CONTROL UNIT

The present application is a U.S. National Stage of International Application No. PCT/AT2018/060082, filed on Apr. 26, 2018, designating the United States and claiming the priority of Austrian Patent Application No. GM 50076/2017 filed on Apr. 28, 2017. All of the aforementioned applications are incorporated herein in their respective entireties by this reference.

The invention relates to an unmanned aerial vehicle having a drive unit for enabling the flight of the aerial vehicle in air space and having a flight control unit, which is configured to receive control information from a radio remote control or to control positions of the aerial vehicle in air space that are characterized by stored position information in order to control the flight course of the aerial vehicle.

In the connection with the presentation of art or information in the entertainment industry, on the occasion of public and private events or in general, respectively, it is often desired to provide an illustration in air space. This may be realized, for example, by using pyrotechnic articles, by pulling a banner or display by an aeroplane, by illuminating water fountains by means of light, by projecting illustrations onto stationary high-rising facades or on the occasion of flight shows by means of support by coloured smoke.

All the exemplary possibilities mentioned above for providing an illustration in air space have general and/or specific disadvantages. In the following, some of these disadvantages are listed as examples: The use of pyrotechnic articles has a danger potential and negative effects on the environment. A flight show has a substantial danger potential, is extremely expensive and the aeroplanes are moving fundamentally too fast in order to enable complex or informative illustrations. When pulling a banner, the disadvantages are rather similar: The illustration or information, respectively, on the banner is static, merely two-dimensional and at the majority of times poorly visible. Illuminating water fountains using lights is limited in height, three-dimensionality and complexity. None of these solutions makes it possible to create illustrations in air space, which have a certain minimum size, which are able to reproduce essentially the same illustrations, which hare dynamic, interactive and reusable.

The development of the recent years in the technical field of unmanned aerial vehicles, UAVs, in particular in the field of "drones" or "multicopters", respectively, has led to the fact that such aerial vehicles are being used for the provision of such illustrations in air space.

At the occasion of the public music event "Klangwolke" on the 1 of September, 2012, in Linz, Austria, there were combined 49 "quadrocopters" into a dynamic flight formation in order to represent dynamic illustrations and visualisations in air space. Each quadrocopter had a light diffusion screen and an LED light source within this screen. In this way, each quadrocopter formed a "pixel" of the illustration in air space, a so-called "SPAXEL".

The provision of such a flight formation using UAVs, hence, only solves the disadvantages of the possibilities mentioned above for providing an illustration in air space, being, however, rather challenging in regard to the technology utilized and the necessary know-how. In particular, the hard- and software of each UAV has to be developed in a cumbersome way and adjusted on a regular basis in order to satisfy the special requirements for the use within a dynamic flight formation. In addition, there is required specific expert knowledge and experience in regard to the air force management of the flight formation group.

The invention, hence, is based on the task to provide an unmanned aerial vehicle, which addresses the challenges mentioned above and which at least reduces the disadvantages associated therewith. Furthermore, in this connection, economic criteria such as time expenditure and system costs but rather also the technology for enabling the formation flight should be improved.

According to the invention this task is solved by the provision of a modular flight formation control unit, which has a first interface with the flight control unit and a second radio interface with a flight formation ground control unit or with flight formation control units of other aerial vehicles, wherein the flight formation control unit has signal generating means for generating or sending means for sending control information corresponding to the radio remote control and is configured to output, via the first interface, flight formation information that is relevant for the formation flight of at least two aerial vehicles to the flight control unit.

By way of the inventive modular flight formation control unit, which may advantageously be attached/integrated in/at an unmanned aerial vehicle of a commercially available construction type, in particular a commercially available drone, it is, among others, for the very first time possible to provide a dynamic flight formation group for illustrations in air space by means of aerial vehicles of commercially available construction type. The aerial vehicle merely requires the technical functionality to control the drive unit by means of the flight control unit. Any other functions, which are necessary and advantageous for the flight of the aerial vehicle/s and/or the formation flight of a group or a flight formation group, respectively, are assumed by the flight formation control unit and optionally correspondingly transmitted to the flight control unit. In this way, for example, the control information of a (commercially available manual) radio remote control is transmitted or simulated. The hard- and software of the modular flight formation control unit may be manufactured, developed and/or continuously improved, independently of the aerial vehicles, which constitutes another big advantage in regard to the challenges and criteria mentioned above.

The first interface is usefully configured, via a cable interface, with the signal generating means for generating the control information corresponding to the radio remote control. In this way, there is enabled a very safe and interruption-resistant connection between the flight formation control unit and the flight control unit. The flight formation control unit usefully communicates via the cable interface with the radio control unit according to one of the following protocols or concepts: Micro Air Vehicle Communication Protocol; CAN Bus Protocol; I2C; UART connection; emulation of the radio remote control.

The first interface is usefully configured as a first radio interface with the sending means for sending the control information corresponding to the radio remote control. In this way, there may be realized, for example, a rather simple integration or an as simple attachment as possible of the flight formation control unit with/at the aerial vehicle. In an advantageous embodiment the flight formation control unit has position determining means for monitoring whether the aerial vehicle is in a predefined flight zone, wherein the flight formation control unit is configured to output a flight formation control information for specifying an altered flight course or for correcting the planned flight course of the aerial vehicle to the flight control unit if there is the danger that the aerial vehicle leaves the predefined flight zone. In this way, there may be, among others, increased the safety of the system by, for example, preventing that the aerial vehicles leave a flight safety zone, which is defined as being safe in regard to any observer or random passer-by, or that they overfly a limit of maximum communication range. In this regard, in an especially advantageous embodiment the flight formation control unit, upon receiving a special flight command or a return command via the second radio interface from the flight formation ground control, may be configured to output a flight formation control information for specifying an altered flight course or for correcting the planned flight course of the aerial vehicle to the flight control unit in order to control the aerial vehicle along a predefined special flight course or at a predefined return landing position.

In a further advantageous embodiment the flight formation control unit has time measuring means for determining the period of time, during which there was not existent any sufficient radio connection with the flight formation ground control unit, wherein the flight formation control unit, upon exceeding a maximum period of time, is configured to output a flight formation control information for specifying an altered flight course or for correcting the planned flight course of the aerial vehicle to the flight control unit in order to control the aerial vehicle within a predefined flight zone or without overflight of a predefined exclusion zone, respectively, to a predefined return landing position. In this way, safeguarding against failure may be increased, wherein the aerial vehicles autonomously fly to a predefined landing site if the radio or control connection, respectively, with the flight formation ground control unit has been interrupted for longer than the maximum period of time.

In an advantageous embodiment there are provided one or several of the following auxiliary units in the modular flight formation control unit provided in a housing: LED light sources; LASER light sources; light reflecting device; fireworks launching device; smoke generating means; display means; loudspeakers; microphone; optical sensor, in particular camera; image recognition unit; distance sensor; temperature sensor; moisture sensor; transporting unit. In this way, the aerial vehicle may, among others, be very easily and variably adjusted to its designated use.

The aerial vehicle is usefully configured as a drone, in particular as a multicopter. In this way, there are given, among others, advantages in regard to availability, acquisition and adjustment costs, variability, and so on. In this regard it is irrelevant whether uniform drones or types of drones are used for the flight formation (homogenous formation) or whether the formation group is composed of a plurality of completely different drones or types of drones (heterogonous formation).

Furthermore, the invention provides a system for controlling at least two unmanned aerial vehicles within a flight formation, wherein aerial vehicles are provided with modular flight formation control units according to the invention and optionally a flight formation ground control unit in the system, wherein the flight formation ground control unit is configured to communicate via the second radio interfaces of the flight formation control units of the aerial vehicles and the first interfaces thereof with the flight control units of the aerial vehicles and/or the modular flight formation control units are configured to communicate with one another via the second radio interfaces. In this way, the aerial vehicles may, among others, by means of dynamic formation flight, with or without use of a flight formation ground control unit, represent in particular complex and large illustrations.

In this way, there may be advantageously provided two aerial vehicles having a different type of construction, which each have a modular flight formation control unit, in the system for the formation flight. The plurality of the illustrations in air space may thus be increased, for example.

In particular advantageously there may be provided in addition at least one vehicle for the land-bound movement, in particular a car or a robot, or at least one vehicle for the water-bound motion, in particular a ship or submarine, or also other types of aerial vehicles such as, for example, a zeppelin, a fixed-wing aircraft or a flying wing having the mobile flight formation control unit for communicating with the flight formation ground control unit and/or the flight formation control units of the aerial vehicles, ground-bound within the formation with aerial vehicles provided in the system in a flight formation. In this way, the plurality of illustrations may be even more increased, as, for example, the aerial vehicles may follow in air space the ground-bound motions of the cars and vice versa.

The aerial vehicles are usefully formed by commercially available aerial vehicles produced for single flight, in particular by multicopters. In this way, the system may cost-effectively be acquired and optionally also expanded and especially easily and technically reliably adjusted for the formation flight. The modular flight formation control unit according to the invention is correspondingly integrated or attached in each aerial vehicle, land craft or water craft. Especially usefully the flight formation control unit is hereby provided in a housing in a modular way.

In the following the aerial vehicle according to the invention and the system according to the invention are explained in greater detail in a non-limiting manner by way of exemplary embodiments depicted in the drawings.

Figure 1:
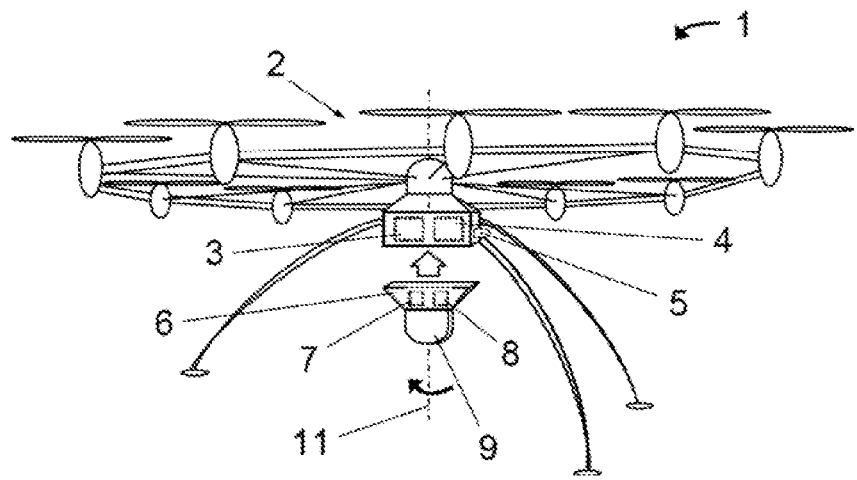
FIG. 1 shows in a schematic perspective an unmanned aerial vehicle according to a first embodiment of the invention.

FIG. 1 shows an unmanned aerial vehicle 1 according to a first embodiment of the invention. The aerial vehicle 1 may thereby be configured as a commercially available drone produced for a single flight, more in general a so-called "octocoper". In this regard, a drive unit 2 of the aerial vehicle 1 is composed of eight rotor units, which are, for example, driven by means of eight electric motors. The drive unit 2 enables the flight of the aerial vehicle 1 in air space.

An "octocoper" is a variant of a "multicopter" having eight rotor units. The aerial vehicle 1 may alternatively be configured as another variant of a multicopter, for example, as a commercially available "quadcopter" having four rotor units, and so on, wherein there is essentially possible any number of rotor units. The unmanned aerial vehicle 1, however, may also be any aerial vehicle that may be stabilized in its position in air space (e.g., zeppelin, balloon and many more). Similarly, it would also be possible to have model aeroplanes fly in a flight formation.

The term "air space" thereby relates to any possible space above an artificial or natural ground within or outside of an artificial or natural space or a building, respectively.

The aerial vehicle 1 further has a flight control unit 3, which is configured to control the drive unit 2, this is the rotor units, of the aerial vehicle 1 in air space in order to control the flight course of the aerial vehicle 1. The flight control unit 3 receives the control information from the user of a manually operated radio remote control (not depicted) or a flight formation ground control unit 15 depicted in FIG. 2. The aerial vehicle 1 thus will not require any further technical functionality and/or "intelligence" in order to perform a flight course in air space.

The radio remote control may be a commercially available radio remote control, which has been sold together with the aerial vehicle 1. Alternatively, there may also be used a commercially available computer, a laptop computer, a tablet computer, a smartphone and so on. Using the flight control unit 3, it is, hence, possible to control the aerial vehicle 1 at a determined flight velocity to a determined position in air space. For this purpose, the rotors of the drive unit 2 are accordingly controlled by the flight control unit 3.

In addition, the inventive aerial vehicle 1 has a modular flight formation control unit 6, which is accommodated in a housing in a modular manner, protected against weather effects. The modular flight formation control unit 6 according to the invention may be coupled to the commercially available aerial vehicle 1 that is produced for a single flight, in particular to the commercially available drone. For this purpose, the flight formation control unit 6 is configured to be attached at the aerial vehicle 1 along the arrow depicted in FIG. 1 and also optionally to be removed from this. This may be carried out, for example, by means of any type of releasable or non-releasable attachment, for example, by way of a plug-in, adhesive or screw-type connection. Alternatively, the flight formation control unit 6 may be inserted into a single-piece housing of the aerial vehicle 1, for example, accessible via a cover.

The modular flight formation control unit 6 has a first interface 7 with the flight control unit 3 as well as a second radio interface 8. The flight formation control unit 6 further has position determining means 9, for example, a GPS receiver, whereby the current position information may be identified. The first interface 7 is formed by a cable interface according to the exemplary embodiment depicted in FIG. 1. The position information is stored in the flight formation control unit 6, or it is received by this from the flight formation ground control unit 15 depicted in FIG. 2. The position information may be recorded by the flight formation control unit 6, optionally by means of the storage unit 4. The position information may optionally or additionally be calculated essentially in real time by the flight formation control unit 6.

Alternatively, this current position information may also be transmitted by a position determining means already installed in the flight control unit 3, for example, a GPS receiver, via the first interface 7.

Alternatively or additionally, the position information may be stored in a storage unit 4, wherein the flight formation control unit 6 receives the position information from the storage unit 4. In addition, the flight formation control unit 6 may transmit the current position information to the storage unit, where it is then stored, for example, for further control, or as a back-up.

The flight control unit 3 of the commercial available aerial vehicle 1 has a radio receiver for receiving control information of the radio remote control sold together with the aerial vehicle 1, which is attached, by means of a plug-in connection, at the circuit board of the flight control unit 3. According to this exemplary embodiment, the radio receiver is unplugged and optionally removed for coupling the flight formation control unit 6, with the flight formation control unit 6 being plugged into the plug-in connection instead of the radio receiver. The flight formation control unit 6 now has signal generating means for generating control information corresponding to the radio remote control and in particular the radio receiver, whereby the flight formation control unit 6 will control the flight control unit 3 of the aerial vehicle 1 in a way as if the control information would be supplied by the radio receiver of the commercially provided radio remote control. In this way, the flight formation control unit 6 may output flight formation information through cables via the first interface 7 to the flight control unit 3.

The flight formation control unit 6 identifies, for example, the difference between the current position and the planned target position, for example, the stored position information of the corresponding aerial vehicle 1, and transforms a position deviation into control signals, which may be received by the flight control unit 3, and sends these control signals via the first interface 7 to the flight control unit 3, which then transmits these control signals correspondingly to the drive unit 2. In this way, the aerial vehicle 1 is moved along the respective flight course to the target position.

By means of the flight formation control unit 6 it is, hence, possible with the exemplary embodiment to control the aerial vehicle 1 in airspace via the communication path flight formation ground control unit 15→flight formation control unit 6→flight control unit 3, in particular in a flight formation group. Thereby, the flight course of the aerial vehicle 1 may be corrected or "overruled", respectively, this is annulled and overwritten, by the flight formation ground control unit 15 by means of flight formation information, at any point of time, to the flight control unit 3. Similarly, according to establishment of priorities, the flight course that is optionally transmitted by the flight formation control unit 6 may be corrected or overruled, respectively, at any point of time, for example, if this necessary, in order to ensure that an exclusion zone will not be overflown. In this way, the flight course of the aerial vehicle 1 may be adjusted by the flight formation ground control unit 15 and/or the flight formation control unit 6 at any point of time essentially in real time, in particular if safety and/or the flight formation intelligence require so.

In order to prevent collision, there may be carried out either a collision examination with the flight formation ground control unit 15 or already in advance before the storage of the flight courses, or there will be carried out collision preventions during the flight of the aerial vehicles 1 by the flight formation control units 6, in addition taking into account the feedback of sensors installed at the flight formation control unit 6.

Alternatively, the aerial vehicle 1 may further have a flight control unit 6, which is configured to control positions of the aerial vehicle 1 in air space that are characterized by stored position information in order to control the flight course of the aerial vehicle 1. The position information is then stored in a storage unit 4 of the flight control unit 3 or in a separate storage unit 4. The flight control unit 3 receives the position information from the storage unit 4 and may in addition transmit the current position information to the storage unit 4, where it is then stored, for example, as a control or as a back-up. Even if the aerial vehicle 1 is configured to control positions characterized by stored position information, the flight course will be followed in flight by way of the corresponding position information, which the flight control unit 3 receives from the flight formation control unit 6. In this regard, the control information is either supplied by a ground station, in particular a flight formation ground control unit 15, or directly by the flight formation control unit 6. The control information is either transmitted via a protocol, or the control information of the (manual) radio remote control is simulated. For example, an aerial vehicle 1 moved "towards the right" by the (manual) radio remote control is moved to the right by the flight formation control unit 6 until the flight formation control unit 6 recognizes that the target position has been reached, and the flight formation control 6 switches to the "hold position", wherein the flight control unit 3 controls the drive unit 2 according to the specifications of the flight formation control unit 6.

The position information is, for example, "Global Positioning System (GPS)" based three-dimensional coordinates in air spaces, for example, data in the GPS Exchange Format (GPX). The data in the GPX format may contain geo-data, this is the geographical coordinates latitude, longitude and altitude. The aerial vehicle 1, in particular the flight formation control unit 6 and/or the flight control unit 3, furthermore have/has a GPS receiver 5. Alternatively, the data may also be based on the Galileo-, GLONASS-, Beidou/Compass- or any other satellite navigation and/or time indication system or on a local or building-based navigation system for the position determination of the aerial vehicle 1 within and outside of buildings (such as position determination by transmitting sending signals, optical position determination systems, etc.).

The flight course of the aerial vehicle 1 corresponds to a chronological order of positions, which could also be data in the GPX format. The extent of the chronological order determines the flight velocity of the aerial vehicle 1. Advantageously, there is to be changed in particular the chronological order of positions also regarding the running time of the system, for example, by interaction of a user, or new positions of one or several aerial vehicles are to be derived from the interaction of a user. In this connection it is irrelevant in which way the interaction of the user is transmitted to the system.

The radio remote control may be a device, which is specifically designed for the communication between a (central) (ground) station and many mobile stations (1:n), wherein the protocol thereof is tailored for such a communication in flight formation or formation group. In the present exemplary embodiment, the radio remote control would provide the communication between the flight formation ground control unit 15 and the flight formation control units 6 of the aerial vehicles 1. Alternatively, also each flight formation control unit 6 could communicate directly with each flight formation control unit 6 (n:m), wherein the protocol differs from the preceding one in this case. An embodiment is advantageous, in which the radio path may remain the same in regard to band width and frequency.

Alternatively, the first interface 7 may also be configured a first radio interface, wherein the flight formation control unit has sending means for sending control information corresponding to the commercially available radio remote control sold together with the aerial vehicle 1. In this case, the radio receiver of the flight control unit is not unplugged of the plug-in connection of the circuit board of the der flight control unit but is rather used as radio receiver for the flight formation control information sent by the sending means of the flight formation control unit. The flight control means, hence, operate as if the control information received was sent by a radio remote control operated by a pilot, wherein this is actually derived from the flight formation control unit 6 that is attached in the immediate vicinity. In this way there is obtained a good and safe radio connection, wherein the possibility to fly the aerial vehicle using the radio remote control bought may be maintained.

According to a further exemplary embodiment of the invention, the first cable interface may also be realized by an interface defined according to a standard, which, for example, communicates according to the following protocols: Micro Air Vehicle Communication Protocol; CAN Bus Protocol. This is in particular reasonable if the commercially available aerial vehicle 1 already has such an interface with the flight control unit.

While the das aerial vehicle 1 is in a stable, essentially static position in air space, an axis of symmetry 11 of the air vehicle is oriented essentially perpendicularly. The orientation of the aerial vehicle 1 in air space about the axis of symmetry 11 and/or about an, in this case essentially horizontal, pivoting axis (not depicted), is realized, for example, by means of the drive unit 2. All orientations about the axis of symmetry and the pivoting axis are possible.

Figure 2:
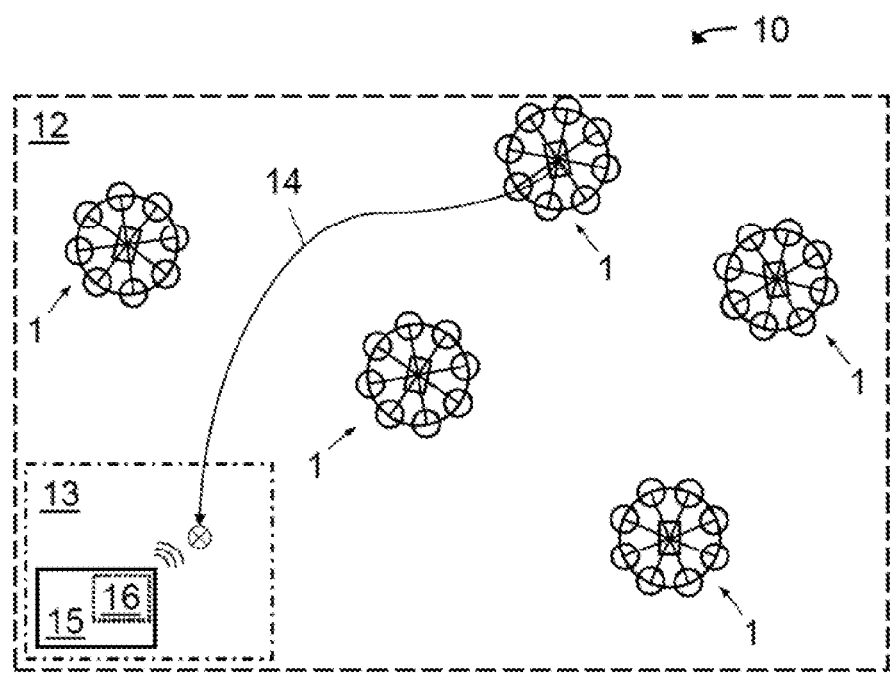
FIG. 2 shows in a top view a system having a plurality of unmanned aerial vehicles according to FIG. 1.

FIG. 2 shows as an example a system 10, consisting of a plurality of unmanned aerial vehicles 1 according to the first embodiment depicted in FIG. 1 and the flight formation ground control unit 15.

The flight formation control units 6 of the aerial vehicles 1 are configured to communicate, via the first interfaces 7 thereof, with the flight control units 3 according to the description given above. The flight formation ground control unit 15 is configured to communicate, via a flight formation ground control communication unit 16 and via the second radio interfaces 8 of the flight formation control units 6, with the flight formation control units 6. Thus the aerial vehicles 1 may be controlled and moved by means of the flight formation ground control unit 15 in a flight formation. In this regard it may advantageously be sufficient, for example, to control only one to five aerial vehicles 1 in order to move a large number, e.g., 100 and more, of aerial vehicles 1 as all other aerial vehicles 1 follow the controlled aerial vehicles 1 on the basis of formation intelligence. In this way, the required amount of transmitted information may be markedly reduced.

"Formation intelligence" in this connection means specific advantages of the formation group flight, in particular the collection movement of several individuals, in this case of several aerial vehicles, within flight formation by way of the movement of several individuals and/or the continuous adjustment of the distances between the individuals, in this case the individual aerial vehicles 1, in mutual dependency of the individual situated nearest thereto. "Formation flight" in this connection means the capability of the system made of flight formation ground control unit 15 and a plurality of flight formation control units 6 to move the aerial vehicles 1 equipped with the flight formation control units 6 in an automated way and as collision-free as possible through the common (air) space.

Optionally, the aerial vehicles 1 may additionally communicate with one another by means of the modular flight formation control units 6 via the second radio interfaces 8, wherein the flight formation control unit 6 is configured, via the first interface 7, to output the formation control information relevant for the formation flight of the aerial vehicles 1 to the respective flight control unit 3. In this way, for example, by the aid of distance sensors that are attached at the flight formation control unit 6, the aerial vehicles 1 may, for example, be moved on the basis of the formation flight intelligence described above.

There are defined a flight zone 12 and a return landing position 13, for example, by way of space coordinates, in particular GPS coordinates in latitude and longitude and altitude information, wherein the flight zone virtually extends essentially vertically upwards and is limited by a maximum flight height of the aerial vehicles 1 upwards or by the altitude specification of the operator. By the position determining means 9 of the flight formation control unit 6 there may thus be monitored whether the aerial vehicle 1 is within the predefined flight zone 12. The flight formation control unit 6 is configured to output a flight formation control information for specifying an altered flight course of the aerial vehicle 1 to the flight control unit 3 if there is danger that the aerial vehicle 1 leaves the predefined flight zone 12.

Such a situation is depicted in FIG. 2 for the aerial vehicle 1 illustrated at the top, wherein the following sequence is carried out essentially in real time: The flight formation control unit 6 registers by way of the der position determining means 9 and the current and/or stored flight course of the aerial vehicle 1 that the aerial vehicle 1 is in danger to leave the predefined flight zone 12. This may, for example, be caused by a strong gust of wind, which urges the aerial vehicle 1 in the direction out of the predefined flight zone 12. The flight formation control unit 6 sends this information to the flight formation ground control unit 15, which sends a special flight command or a return command, respectively, to the flight formation control unit 6. The flight formation control unit 6, upon receiving this return command, outputs an altered flight course of the aerial vehicle 1 to the flight control unit 3 in order to control in this way the aerial vehicle along a predefined special flight course 14 to the predefined return landing position 13.

Optionally, the flight formation control unit 6 may have additional time measuring means for determining the period of time, during which there was not existent any sufficient radio connection with the flight formation ground control unit 15, wherein the flight formation control unit 6, upon exceeding a maximum period of time, will correct the flight course of the aerial vehicle 1 in order to control the aerial vehicle 1 within the predefined flight zone 12, optionally without overflying a predefined exclusion zone, to the return landing position 13.

Figure 3:
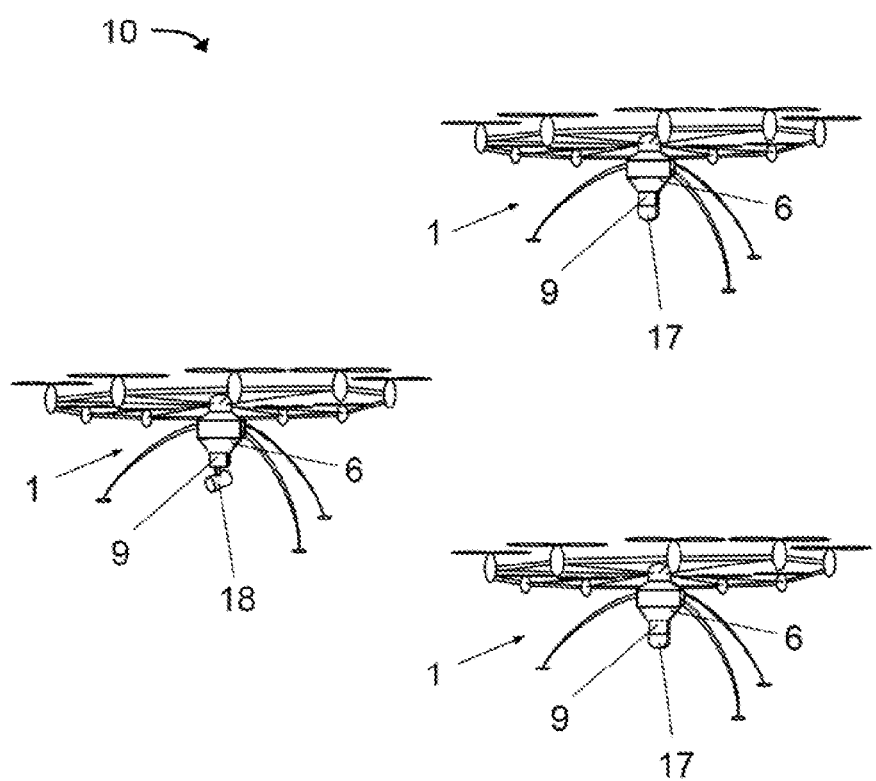
FIG. 3 shows in a schematic perspective a system having a plurality of unmanned aerial vehicles according to a further embodiment of the invention.

The aerial vehicles 1 may also communicate with one another by means of the modular flight formation control units 6 via the second radio interfaces 8, wherein each flight formation control unit 6 controls its respective flight control unit 3 accordingly, with a flight formation ground control unit 15 or the like not being necessary. In addition, the flight formation control units 6 may optionally have access to the flight control units 3 of the other aerial vehicles 1. FIG. 3 shows such a system of unmanned aerial vehicles 1 according to a further embodiment. In this connection, the aerial vehicles 1 are essentially similar to those of the first embodiment, except for the fact that there are provided auxiliary units within the modular flight formation control unit 6 that is provided in a housing.

In the example in FIG. 3, these auxiliary units are either a LED light source 17 or a LASER light source 18. Alternatively and/or additionally, there may be provided a light reflecting device; a fireworks launching device; a smoke generating means; a display means; a loudspeaker; a microphone; an optical sensor, in particular a camera; an image recognition unit; a distance sensor; a temperature sensor; a moisture sensor; a transporting unit for goods and packages, and so on, wherein all combinations of these auxiliary units are conceivable with a modular flight formation control unit 6 according to the invention.

The aerial vehicles 1 of the system 10 may be moved by means of the inventive flight formation control units 6 according to the description above within a flight formation. By means of the aerial vehicles 1, in particular by means of the LED light sources 17 and the LASER light sources 18, there may be generated by way of illustration information, which contains, among others, the position information of the aerial vehicles 1, illustrations in air space. FIG. 3 may herein alternative illustrate a cut-out of a system having essentially more aerial vehicles 1, for example, 100 and more aerial vehicles 1. In this way, there may be provided, advantageously using the flight formation control units 6 and a large number of aerial vehicles 1 controlled in a flight formation, illustrations, for example large-dimensioned and clearly visible visualizations and projections in the form of dynamic three-dimensional complex figures, which are able to reproduce essentially the same illustrations, which are dynamic and interactive.

Optionally, there may be provided in addition at least one car (not depicted) having an inventive modular flight formation control unit 6 for the communication with the flight formation control units 6 of the aerial vehicles 1 ground-bound, in the flight formation with the aerial vehicles 1. In this connection, the aerial vehicles 1, may, for example, "copy" an illustration essentially in real time in air space, which the car "draws" in a ground-bound way. Alternatively, there may be provided in this regard at least one motor vehicle or at least one water craft, in particular a boat or a ship.

There is to be mentioned that an inventive aerial vehicle or a system may be used as a rescue system and/or transport system, for example, in the case of an emergency, or as an information system on the occasion of sports events such as a bicycle race or a marathon. In this connection, there may be provided, for example, by means of a large flight formation of aerial vehicles, aid supplies in large amounts very quickly and accurately. In a disaster zone there may be provided in this connection in particular a parallel supply of several selected positions in order to prevent, in this way, distribution shortages and critical local gatherings of people.

The term unmanned aerial vehicle is to be interpreted very broadly within the scope of this invention, and it could, for example, also comprises hot air balloons, zeppelins, model aeroplanes or model helicopters.

Another possible use of this flight formation module is the use as a "transponder and black box system" for every aerial vehicle equipped with the module. Due to the storage unit integrated in the flight formation module, information such as flight duration, flight position, velocities reached and so on, may be continuously recorded. By means of an advantageous embodiment of the weather-proof housing, for example, as a shock-proof housing, the information stored therein may also be read after recovery, due to a situation terminating in a crash, and it may be available for further (technical or legal) examinations (black box functionality).

Furthermore, due to the permanent connection of the flight formation control module with the ground station, there is given the possibility to advantageously connect several ground stations in a way such that the transfer of an aerial vehicle equipped with a flight formation module according to the invention between two ground stations during flight is being enabled, without having to suspend the safety and security measure describe above. The position information regarding each individual flight formation module, hence, remains at the ground station sending (transponder function).

Every ground station, from which an aerial vehicle equipped with a flight formation control module according to the invention is started, may maintain and change or take effect on, respectively, the control over the flight path now removed of the aerial vehicle, taking into account all safety and security measures. This corresponds to an inventive enlargement of the transponder function within the field of aviation, as far as to the possibility of monitoring and control.

Especially advantageous a network is configured being composed of ground stations having respectively coupled flight formation control modules if an authority within the network (for example, flight control authority) is given control over individual flight formation control modules via the ground stations participating in the network.

In this way, the authority is not only given the possibility to issue certain determined regulation and provisions for air traffic but there is also existent the possibility to enforce measures (for example, closing of a flight zone for the UAV operation, in the case of a disaster), immediately and essentially in real time, thereby meeting all safety-relevant requirements (for example, safe and autonomous landing on an assigned landing position, of each individual UAV in question).

This also leads to the advantageous use of a flight formation module in a single-UAV operation; in particular in regard to the possibility to prepare legally required reports on the professional and business-related use of each individual UAV, automatically from the flight information recorded in the storage module of the flight formation control module.

The invention claimed is:

1. A system for controlling at least two unmanned aerial vehicles in a flight formation, the system comprising a flight formation ground control unit and at least two unmanned aerial vehicles produced for a single flight, wherein the unmanned aerial vehicles each have a drive unit for enabling the flight of the unmanned aerial vehicle in air space and having a flight control unit, which is configured to receive control information from a radio remote control or to control positions of the unmanned aerial vehicle in air space that employ stored position information in order to control the flight course of the unmanned aerial vehicle, and each unmanned aerial vehicle further comprises a modular flight formation control unit designed only within a housing, which has a first interface with the flight control unit and a second radio interface to the flight formation ground control unit, wherein each flight formation control unit has signal generating means for generating, or sending means for sending, control information corresponding to the radio remote control and is configured to output, via the first interface, flight formation control information relevant for the formation flight of the unmanned aerial vehicles to the flight control unit, wherein the flight formation ground control unit is configured to communicate, via the second radio interfaces of the flight formation control units of the unmanned aerial vehicles and the first interfaces thereof, with the flight control units of the unmanned aerial vehicles, wherein the flight formation ground control unit is configured to directly control and move each of the unmanned aerial vehicles in a flight formation.

2. The system according to claim 1, wherein the first interface is formed by a cable interface with the signal generating means, via which cable interface the flight formation control unit communicates with the radio control unit according to one of the following protocols or concepts: Micro Air Vehicle Communication Protocol; CAN Bus Protocol; 12C; UART connection; emulation of the radio remote control.

3. An unmanned aerial vehicle produced for a single flight having a drive unit for enabling the flight of the unmanned aerial vehicle in air space and having a flight control unit, which is configured to receive control information from a radio remote control or to control positions of the unmanned aerial vehicle in air space that employ stored position information in order to control the flight course of the aerial vehicle, further comprising a flight formation control unit being accommodated in a separate housing from the unmanned aerial vehicle in a modular manner, which has a first interface with the flight control unit and a second radio interface to a flight formation ground control unit or to flight formation control units of other unmanned aerial vehicles, wherein the flight formation control unit has signal generating means for generating, or sending means for sending, control information corresponding to the radio remote control and is configured to output, via the first interface, flight formation control information relevant for the formation flight of at least two unmanned aerial vehicles to the flight control unit, wherein the first interface is configured as a first radio interface with the sending means.

4. The system according to claim 1, wherein the flight formation control unit has position determining means for monitoring whether the unmanned aerial vehicle is in a predefined flight zone, wherein the flight formation control unit is configured to output a flight formation control information for specifying an altered flight course or for correcting the planned flight course of the unmanned aerial vehicle to the flight control unit if there is given the danger that the unmanned aerial vehicle leaves the predefined flight zone.

5. The system according to claim 1, wherein the flight formation control unit, upon receiving a special flight command or a return command via the second radio interface from the flight formation ground control unit, is configured to output a flight formation control information for specifying an altered flight course or for correcting the planned flight course of the unmanned aerial vehicle to the flight control unit in order to control the unmanned aerial vehicle along a predefined special flight course and/or to a predefined return landing position.

6. An unmanned aerial vehicle produced for a single flight having a drive unit for enabling the flight of the unmanned aerial vehicle in air space and having a flight control unit, which is configured to receive control information from a radio remote control or to control positions of the unmanned aerial vehicle in air space that employ stored position information in order to control the flight course of the unmanned aerial vehicle, further comprising a flight formation control unit designed only within a housing, which has a first interface with the flight control unit and a second radio interface to a flight formation ground control unit or to flight formation control units of other unmanned aerial vehicles, wherein the flight formation control unit has signal generating means for generating, or sending means for sending, control information corresponding to the radio remote control and is configured to output, via the first interface, flight formation control information relevant for the formation flight of at least two unmanned aerial vehicles to the flight control unit, wherein the flight formation control unit has time measuring means for determining the period of time, during which there was not existent any sufficient radio connection with the flight formation ground control unit, wherein the flight formation control unit, upon exceeding a maximum period of time is configured to output a flight formation control information for specifying an altered flight course or for correcting the planned flight course of the unmanned aerial vehicle to the flight control unit in order to control the unmanned aerial vehicle within a predefined flight zone or without overflight of a predefined exclusion zone, respectively, to a predefined return landing position.

7. The system according to claim 1, wherein the modular flight formation control unit, which is provided in a housing, comprises one or more of the following auxiliary units: LED light sources; LASER light sources; light reflecting device; fireworks launching device; smoke generating means; display means; loudspeakers; microphone; optical sensor; image recognition unit; distance sensor; temperature sensor; moisture sensor; or, transporting unit.

8. The aerial vehicle system according to claim 1, wherein the unmanned aerial vehicle comprises a multicopter.

9. A system for controlling at least two unmanned aerial vehicles in a flight formation, wherein the unmanned aerial vehicles are provided with modular flight formation control units according to claim 1 and further comprise a flight formation ground control unit within the system, wherein the flight formation ground control unit is configured to communicate, via the second radio interfaces of the flight formation control units of the unmanned aerial vehicles and the first interfaces thereof, with the flight control units of the unmanned aerial vehicles and/or the modular flight formation control units are configured to communicate with one another via the second radio interfaces.

10. The system according to claim 9, wherein at least two unmanned aerial vehicles, having different respective constructions, each have a modular flight formation control unit, are provided in the system for the formation flight.

11. The system according to claim 9, wherein at least one vehicle, comprising a car, is provided for a land-bound movement, or at least one vehicle is provided for a water-bound movement with the mobile flight formation control unit for communication with the flight formation ground control unit and/or the flight formation control units of the unmanned aerial vehicles, ground-bound within the flight formation with aerial vehicles provided in the system in a flight formation.

12. The system according to claim 9, wherein the unmanned aerial vehicles comprise unmanned aerial vehicles configured for a single flight.

13. A flight formation control unit for an unmanned aerial vehicle, wherein the flight formation control unit is provided in a housing in a modular way and has a first interface to a flight control unit and a second radio interface to a flight formation ground control unit or to flight formation control units of other aerial vehicles, wherein the flight formation control unit has signal generating means for generating, or sending means for sending, control information corresponding to a radio remote control and is configured to output, via the first interface, flight formation control information relevant for the formation flight of at least two aerial vehicles to the flight control unit.

* * * * *